Sept. 18, 1945.    R. M. WILEY    2,385,318
FABRICATING POLYMERIC VINYLIDENE CHLORIDE
Filed Feb. 26, 1943
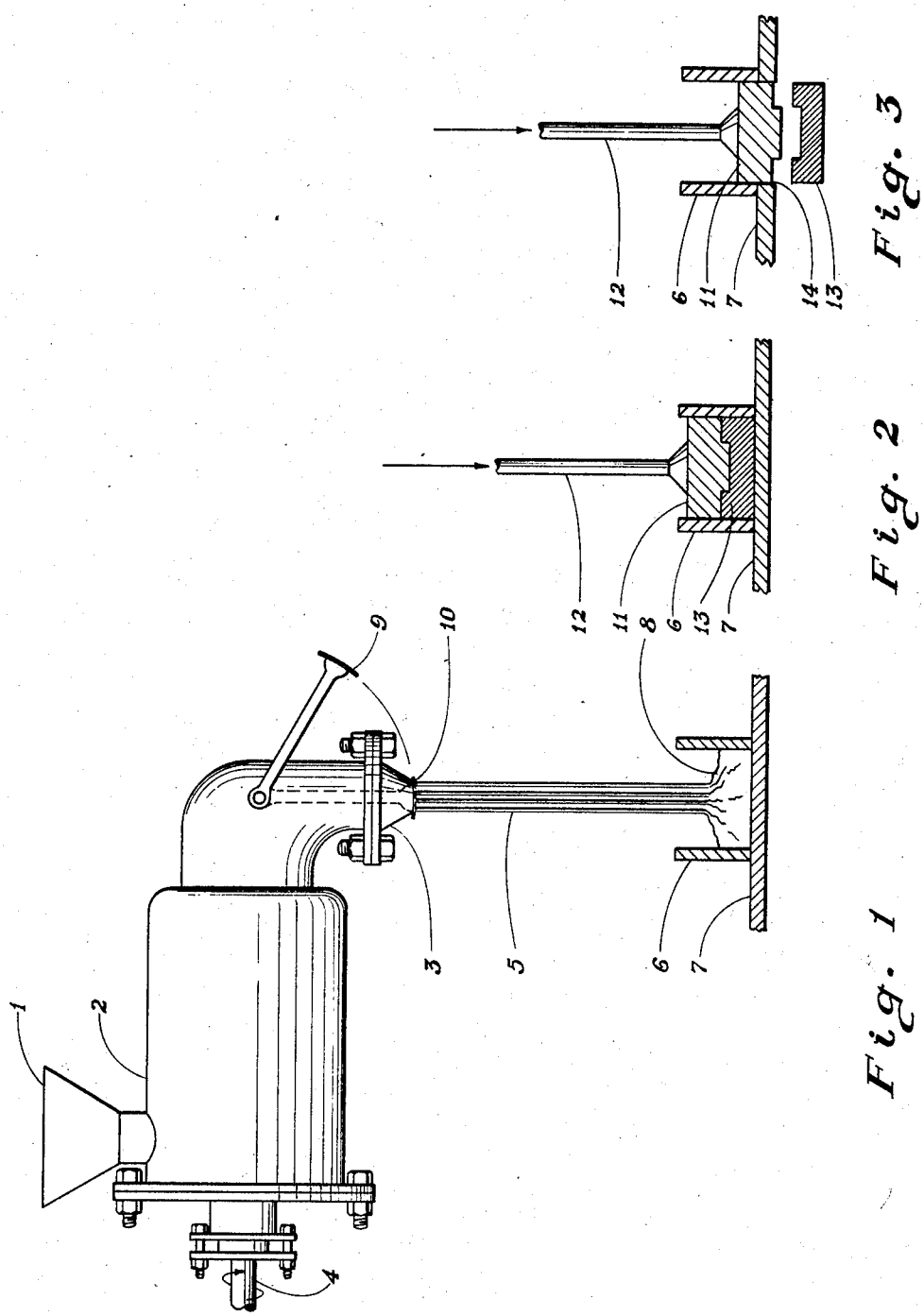
INVENTOR.
Ralph M. Wiley
BY
Griswold & Burdick
ATTORNEYS Patented Sept. 18, 1945

2,385,318

UNITED STATES PATENT OFFICE 2,385,318

FABRICATING POLYMERIC VINYLIDENE CHLORIDE

Ralph M. Wiley, Midland, Mich., assignor to The Dow Chemical Company, Midland, Mich., a corporation of Michigan Application February 26, 1943, Serial No. 477,215

3 Claims. (Cl. 18—47.5)

This invention relates to methods of fabricating articles from polymeric vinylidene chloride. It more particularly concerns a method of fabricating such material into bodies having sections of such thickness that they cannot satisfactorily be formed by standard molding practice.

The term "polymeric vinylidene chloride" as used herein and in the appended claims means the polymers and copolymers of vinylidene chloride of high molecular weight, which in the solid state normally exhibit an X-ray diffraction pattern characteristic of crystalline structure.

This crystalline structure of polymeric vinylidene chloride disappears upon such heating or melting as is required to render the material readily deformable for conventional fabricating operations, such as molding, extrusion, and the like. The polymer, however, has a tendency to decompose on prolonged heating at or near its melting point, yielding carbon and hydrogen chloride, and this tendency is increased by certain impurities which may be present in the material. Because it has a very low coefficient of thermal conductivity, the melted polymer cools slowly when cast or molded and thus thick sections tend to decompose at the innermost portions before they have cooled sufficiently to become heat stable. Such decomposition may cause not only discoloration but also defects due to the presence of char and bubbles in fabricated articles.

The difficulty caused by decomposition can be ameliorated to some extent by incorporating in the material either a plasticizer or a stabilizer or both. Some plasticizers facilitate molding by lowering the melting temperature, while others reduce the viscosity of the molten mixture. Still others act as stabilizers, in that they tend to reduce decomposition at molding temperatures. Nevertheless, even with these aids, so far as I am aware, there is no commercially available method by which polymeric vinylidene chloride can be molded into an integral form or shape having a relatively thick cross-section without the danger of producing defects due to decomposition.

One of the objects of my invention is to provide a method of fabricating or molding polymeric vinylidene chloride by which articles can be produced having relatively heavy or thick cross-sections without the difficulties which are due to decomposition during the operation.

Another object of the invention is to provide a way of shortening the time required for hardening of the polymer below that required in the normal cycle in operations such as injection molding an extrusion casting.

Other objects and advantages will become apparent as the description proceeds.

I have discovered that molten polymeric vinylidene chloride, when cooled to within a certain temperature range below its melting point, remains temporarily soft, tacky, cohesive, and coalesces readily, thus permitting the forming or accumulation of large coherent masses at a temperature low enough to avoid decomposition of the polymer. The accumulated mass or formed article then hardened quickly so that it can be removed from a mold. Since the polymeric mass is at a temperature within the range in which it hardens rapidly, it is unnecessary to cool the mass further and, in fact, further cooling may tend to lengthen the time the material must be maintained in a mold or supported in shape before it is hardened sufficiently to be removed.

The invention involves the steps of melting polymeric vinylidene chloride under conditions such that substantial decomposition is avoided and simultaneously or thereafter shaping the fused polymer into thin sections such as filaments, say of sixty to one hundred thousandths inch in diameter, or tapes of similar thickness. The molten material is then cooled to a temperature in the range between 10 centigrade degrees below its melting point and about 90 degrees centigrade or, more broadly, to a temperature below said upper limit and within the range in which it will coalesce. Thereafter, and before recrystallization interferes with the ability of the material to coalesce, a mass of the cooled material is accumulated and, if necessary, subjected to pressure to facilitate complete coalescence. The accumulated mass or shaped article hardens, due to crystallization, within a period of ordinarily less than a minute and can be removed from the mold in which it has been accumulated or formed.

The invention, then, consists of the method hereinafter fully described in the specification and annexed drawing, and particularly pointed out in the claims.

In said drawing:

Fig. 1 is a side elevation partly in section of apparatus for use in the invention diagrammatically showing the accumulation in a mold of polymeric vinylidene chloride after being melted in an extruder and cooled by passage through the air.

Fig. 2 is a side elevation partly in section of the mold of Fig. 1 showing the molding of the polymeric vinylidene chloride after accumulation in the mold.

Fig. 3 is another view of the mold of Fig. 2 showing the ejection of the finished molding.

According to the invention, the polymeric vinylidene chloride is heated, preferably in thin sections and as rapidly as possible, at least to the melting point, that is, to the temperature at which the crystalline structure disappears. The melting temperature varies with the polymer or copolymer composition. Polyvinylidene chloride melts at about 195° C. The crystalline copolymers are generally lower melting, having melting temperatures usually in the range of from about 150° C. to 180° C. For example, the copolymer containing about 90 parts of vinylidene chloride and about 10 parts of vinyl chloride melts at about 170° C., and that containing about 85 parts of vinylidene chloride and about 15 parts of vinyl chloride melts at about 150° C. After the material has been melted, it is immediately cooled below the melting temperature, preferably at least 10 centigrade degrees, to a temperature at which it acquires a temporary tacky consistency, in which condition it is soft and cohesive so that it coalesces. The temperature range over which the foregoing properties are temporarily retained varies similarly to the melting point. For example, for polyvinylidene chloride, this temperature range is between about 190° and 90° C., for the copolymer of 90 parts of vinylidene chloride and 10 parts of vinyl chloride, the range is between about 160° and 90° C. or preferably between 140° and 110° C., and for the copolymer of 85 parts of vinylidene chloride and 15 parts of vinyl chloride, the range is between about 140° and 90° C. or preferably between about 130° and 100° C. The addition of the usual plasticizers shifts each of these ranges of temperature downwardly roughly 1 centigrade degree for each per cent of plasticizer added. In general, the temperature at this stage should not be reduced below about 90° C.

The length of time which the material remains in the soft plastic, tacky, cohesive condition after being thus cooled after melting varies with its composition and temperature. It is shortest with polyvinylidene chloride, being, for example, about 5 to 10 seconds at 140° C. For the copolymer of 90 parts of vinylidene chloride and 10 parts of vinyl chloride, it is about 50 to 80 seconds; and for the copolymer of 85 parts of vinylidene chloride and 15 parts of vinyl chloride, it is about 150 to 300 seconds, both at 140° C. In other copolymers of vinylidene chloride, this plastic, tacky, cohesive state also endures for a similar period of time upon cooling suitably below their respective melting points.

After being cooled and while still in the tacky state, the material is accumulated into an integral coherent mass, as by charging into a mold or receptacle, and, if desired, the mass may be given shape by pressing or molding. The mass, with or without shaping, soon hardens, without further cooling, and ceases to be plastic.

A convenient way to melt the polymeric vinylidene chloride is to feed the same, in the form of molding powder or the like, into a plastic extruder of usual design, provided with a forwarding screw and having a heating jacket to supply heat sufficient to melt the material as it is forwarded through the apparatus to the extrusion orifice. The melted material discharged from the orifice is permitted to fall by gravity through a body of cooling fluid, such as air or water, a sufficient distance to cool the hot material to such temperature below the melting point that it becomes tacky. Thus cooled, the falling stream is collected in a mold or other receptacle in which it may be molded at once before it hardens. Such falling stream of cooling polymer should be of small diameter, preferably not over about $\frac{3}{16}$ inch, to secure a suitable rate of heat transfer through it. A multiple orifice discharging a plurality of streams is preferred. For handling larger masses of material, a plurality of extruders may be used. While in the tacky state, the polymer coalesces readily, permitting the several streams, when caught in the collector, or otherwise brought together, to accumulate into an integral mass.

Various means may be employed for molding the tacky material in the collector. For example, the collector may itself have the shape of a mold, in which the tacky material is allowed to harden, with or without the application of pressure. Another way is to employ a receptacle in which a plunger operates to force the tacky material into a die.

It is characteristic of polymeric vinylidene chloride molded in this tacky state that the bodies so formed are sound and free from discoloration or defects caused by decomposition, as illustrated by the following examples.

*Example 1*

A quantity of a copolymer comprising 90 parts of vinylidene chloride and 10 parts by weight of vinyl chloride and plasticized with 10 per cent by weight of di-(alpha-phenylethyl) ether was melted by heating it to 175° C. in an extruder. The polymer was discharged through a single orifice of 0.095 inch diameter at the rate of 1.5 pounds per hour. Upon leaving the orifice, the extruded and heated material in the melted state was allowed to fall through air at room temperature a distance of about 20 inches into a cylindrical receptacle about 1¾ inches in diameter and 2¼ inches in height. The material was thereby cooled to about 140° C. As the receptacle was thus being filled with the material, it was tamped by hand with a small rod resulting in the formation of a continuous integrated mass molded to the shape of the vessel. The molded material was allowed to harden and cool to room temperature. Examination of cross-sections of the hardened material showed it to be perfectly fused and free from discoloration or defects due to decomposition.

*Example 2*

A quantity of a copolymer comprising 90 parts of vinylidene chloride and 10 parts of vinyl chloride and plasticized with 10 per cent by weight of di-(alpha-phenylethyl) ether was heated to 172° C. by passing it through a plastic extruder having six discharge orifices each 0.095 inch in diameter at the rate of 32 pounds per hour. The material discharged from the orifices was allowed to fall freely through the air at room temperature a distance of 4 feet onto a horizontal metal plate, on which it accumulated, having been cooled to about 140° C. The material was kneaded together on the plate and molded into a single coherent mass 3 inches in diameter and 3 inches long under a pressure of 5 pounds. After cooling to room temperature it was sectioned and found to be free from defects.

Although the foregoing examples illustrate the application of the invention to vinylidene chloride copolymerized with vinyl chloride, it will be understood that it may applied to other copolymers of vinylidene chloride which normally exhibit X-ray diffraction patterns characteristic of crystalline structure and which may be obtained by polymerizing together monomeric vinylidene chloride in major proportions with a minor proportion of one or more other polymerizable materials, such as vinyl acetate, vinyl cyanide, the ester of acrylic or methacrylic acid, allyl and related esters of carboxylic acids, etc., and that any of the known plasticizers and stabilizers may be present in the polymeric material without departing from the invention.

In practice, the invention may be carried out in various ways, one preferred mode of operation being diagrammatically indicated in the drawing in which like numerals designate like parts in the several figures.

Referring to Fig. 1 of the drawing, polymeric vinylidene chloride is fed into the hopper 1 of the heated extruder 2 provided with the multiple discharge orifice 3. Rotation of the worm shaft 4 drives the polymer through the extruder and during its passage is heated to the melting point. The melted material descends in a plurality of streams 5 into the open mold 6 supported upon the plate 7. The length of travel of the material between the multiple discharge orifice 3 and the mold 6 is so adjusted that upon reaching the mold it is cooled preferably at least about 10 centigrade degrees. The desired amount of material is discharged from the extruder into the mold and then the supply is cut off as by moving the cutoff valve 9 into the position 10, thereby closing openings of the multiple discharge orifice 3. The mold 6 is then moved along the plate 7 and brought under die 11 attached to the ram 12 as shown in Fig. 2. Pressure such as 5 to 100 pounds or more may be applied to the material in the mold by actuating the ram 12 while the material is still in the tacky, cohesive state before it hardens. After the molding 13 is thus formed, it is allowed to harden and then it is discharged from the mold 6 by moving it over the opening 14 in the plate 7 and moving the ram 12 further into the mold as shown in Fig. 3. After the finished molding is discharged from the mold 6, it is returned to the position on the plate 7 below the multiple discharge orifice 3 as shown in Fig. 1. The valve 9 is then swung away from the multiple discharge orifice and the foregoing operations may be repeated thereby producing moldings in succession.

Another mode of operation by which the invention may be used to form polymeric vinylidene chloride into a coherent mass having a thick section is by laying together and uniting a plurality of streams of the cooled material while in a temperature range in which it will coalesce so that the cross-sectional area of the accumulated mass is more or less equal to the sum of the areas of the cross-sections of the individual streams. As an illustration, a rectangular bar of large cross-section, for example, may be formed by extruding a plurality of molten thin tape-like streams of the material the width of the bar to be formed. The molten streams are allowed to cool below the melting point sufficiently so that the material is brought to the temporary tacky condition and while in this condition the streams are aligned and laid face to face to form a pile. Slight pressure is then applied, if necessary, as by passing the pile through a pair of rolls. Union of the separate tape-like streams is thus obtained giving an integrated coherent mass of the material in the form of a rectangular bar of large cross-section which soon hardens.

I claim:

1. A method of fabricating articles from polymeric vinylidene chloride which comprises melting the material, forming the melted material into a thin stream less than $\frac{3}{16}$ inch thick, cooling the thin stream only to the temporarily tacky state in which the material is still capable of coalescence, and not below 90° C., forming a unitary mass by uniting exposed tacky surfaces of the moderately cooled stream, and, before recrystallization from the temporarily tacky condition has been induced by temperature alone, shaping the mass while the coalesced material is still at a temperature between 90° C. and 10 centigrade degrees below its melting point, and maintaining the shaped article at a temperature in said range until the article is hardened.

2. A method of fabricating articles from polymeric vinylidene chloride which comprises melting the material, forming the melted material into a thin stream less than $\frac{3}{16}$ inch thick, cooling the thin stream only to the temporarily tacky state in which the material is still capable of coalescence, and not below 90° C., collecting and allowing the moderately cooled stream to coalesce in a mold in a mass sufficient to form the desired thickness in a molded article, and, before recrystallization from the temporarily tacky condition has been induced by temperature alone, applying pressure to the mold while the coalesced material is still at a temperature between 90° C. and 10 centigrade degrees below the melting point, and maintaining the shaped article at a temperature in said range until the article is hardened.

3. A method of fabricating articles from polymeric vinylidene chloride which comprises melting the material, extruding the melted material in a plurality of thin streams less than $\frac{3}{16}$ inch thick, cooling said streams only to the temporarily tacky state in which the material is still capable of coalescence, and not below 90° C., accumulating and allowing the so extruded and cooled streams to coalesce in a mold in a mass sufficient to form the desired thickness in a molded article, and, before recrystallization from the temporarily tacky condition has been induced by temperature alone, applying pressure to the mold while the coalesced material is still at a temperature between 90° C. and 10 centigrade degrees below its melting point, and maintaining the shaped article at a temperature in said range until the article is hardened.

RALPH M. WILEY.